W. WETZKE.
COUPLING HOOK.
APPLICATION FILED JUNE 5, 1908.
907,927.
Patented Dec. 29, 1908.
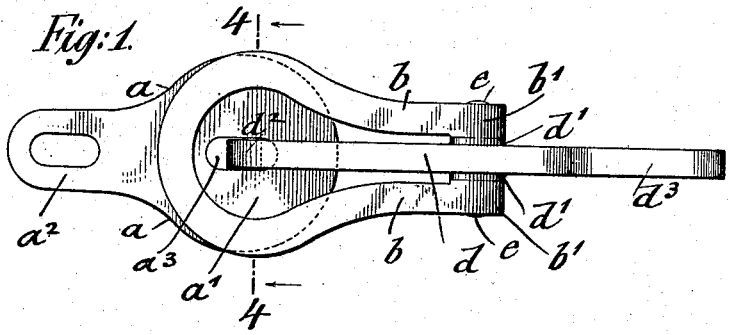
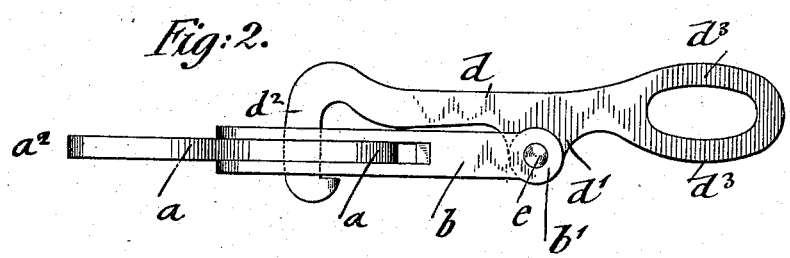
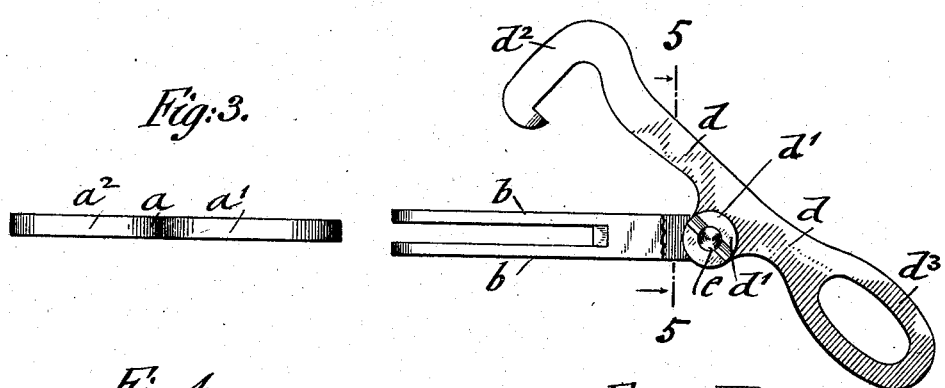
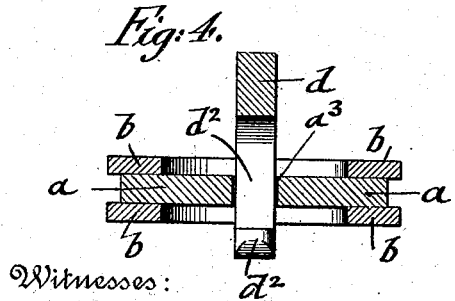
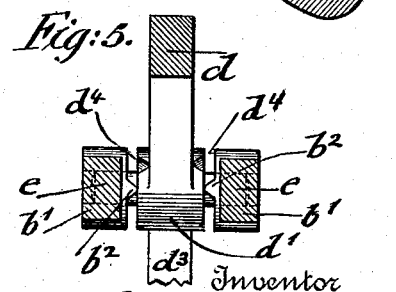
Inventor
Woldemar Wetzke
By his Attorneys
Goepel & Goepel

UNITED STATES PATENT OFFICE.

WOLDEMAR WETZKE, OF NEW YORK, N. Y.

COUPLING-HOOK.

No. 907,927.   Specification of Letters Patent.   Patented Dec. 29, 1908.

Application filed June 5, 1908. Serial No. 436,937.

*To all whom it may concern:*

Be it known that I, WOLDEMAR WETZKE, a citizen of the Empire of Germany, residing at New York, in the borough of Manhattan, county and State of New York, have invented certain new and useful Improvements in Coupling-Hooks, of which the following is a specification.

This invention relates to an improved coupling hook which is intended for use with heavy harness, for heavy wagon-chains, for military wagons, artillery harness, and for coupling trolley, horse and other cars; and for this purpose the invention consists of a coupling hook which comprises a disk-shaped link applied to a stationary point and provided with a slotted shank, a double U-shaped link fitting on the disk-shaped link and interlocked therewith by a fulcrumed lever that is attached by its slotted shank to a detachable portion of the harness or other device and adapted to engage by its hook-shaped end the slot in the disk-shaped link, the ends of the double link being provided at their faces adjacent to the eye of the hub of the lever with raised portions for interlocking with corresponding notches on the hub of the lever when the hook-shaped end is placed in interlocking position with the slotted disk-shaped link.

In the accompanying drawings, Figure 1 represents a plan-view of my improved coupling hook, Fig. 2 is a side-elevation of the same, showing the parts of the coupling hook in locked position, Fig. 3 is a side-elevation, showing the parts of the coupling hook in detached or unlocked position, and Figs. 4 and 5 are respectively a vertical transverse section on line 4, 4, Fig. 1, and 5, 5, Fig. 3.

Similar letters of reference indicate corresponding parts.

Referring to the drawings, $a$ represents the non-detachable member of my improved coupling hook, which member is formed of a disk-shaped portion $a^1$ and a narrow slotted shank $a^2$. The disk-shaped member $a$ is provided with a center-slot $a^3$. It is inserted into a double link $b$, which is made of U-shape and contracted at the ends or shanks, the double link passing over the member $a$ so that the latter is guided between the upper and lower portions of the double link $b$. The contracted ends of the double link $b$ are connected by a pivot with an eye or hub $d^1$ which is located approximately at the middle portion of a fulcrumed lever $d$, that is provided at one end with a hook $d^2$ and at the other end with a slotted shank $d^3$, the latter being adapted to be connected to the movable point of the harness, wagon, car or other object, while the member $a$ is connected to a stationary point of the harness, wagon or car. The ends of the double link $b$ are made in the shape of eyes $b^1$ so as to permit the passage of the pivot-pin $e$ through the same. The faces of the eyes $b^1$ of the double link $b$ adjacent to the eye or hub $d^1$ of the lever $d$ are provided with projections $b^2$ which interlock with corresponding notches $d^4$ in the adjacent faces of the eye or hub of the coupling lever $d$ when the latter is placed in locked position. When the lever $d$ is placed in open position, the projections $b^2$ cause the spreading apart of the eyes at the inner ends of the double link so as to hold the hook in unlocked position, but permit the quick locking of the same when the disk-shaped member is introduced into the double link and the coupling lever is brought down so as to engage the slotted center-portion of the disk-shaped member. For opening the coupling hook and disconnecting the disk-shaped link from the double link, the coupling lever is taken hold of at the outer end and lifted against the spring-tension of the shanks of the double link so as to spring them apart, as shown in Fig. 5, and permit thereby the disconnection of the hook-shaped end from the slot of the disk-shaped link. When the parts are to be coupled together, the double link is placed over the disk-shaped link or vice versa and the coupling lever is moved in downward position so that its hook-shaped end engages the slot of the disk-shaped link, while the projections on the eyes of the double link snap into the recesses or notches on the hub of the coupling lever and interlock therewith so as to hold the double link rigidly in locked or coupled position with the disk-shaped link or member.

As the parts of the coupling hook, when locked together, are only subjected to strain in longitudinal direction there is no possible danger of an accidental uncoupling of the parts until the coupling lever is taken hold of at the outer end and released by swinging it on its pivot-connection. The coupling hook forms a quickly operated and very effective connection between the stationary and movable parts of harness, heavy cannons, trolley and horse cars and for other applications. It can be made on a smaller scale for ordinary harness and on a larger scale for the coupling together of parts of harness, vehicles, cannons, cars etc.

Having thus described my invention, I claim as new and desire to secure by Letters Patent:

1. A coupling hook comprising a disk-shaped member having a slotted shank, said disk-shaped member having a center-slot, a double link adapted to be placed over the disk-shaped link and formed of approximately U-shape, and a coupling lever fulcrumed to the ends of the double link and provided with an interlocking hook at the inner end and a slotted shank at the outer end.

2. A coupling hook comprising a disk-shaped link having a slotted shank, said disk-shaped link having a center-slot, a double link placed over the disk-shaped link and formed of approximately U-shape, a coupling lever pivoted to the eye-shaped ends of the double link and provided with an interlocking hook at the inner end and a slotted shank at the outer end, and means for interlocking the eye-shaped ends of the double link with the eyes or hub of the coupling lever.

In testimony, that I claim the foregoing as my invention, I have signed my name in presence of two subscribing witnesses.

WOLDEMAR WETZKE.

Witnesses:
    PAUL GOEPEL,
    H. E. ROCKWELL.